J. A. STONE.
TONGUE TRUCK.
APPLICATION FILED DEC. 2, 1908.
914,466.
Patented Mar. 9, 1909.
2 SHEETS—SHEET 1.
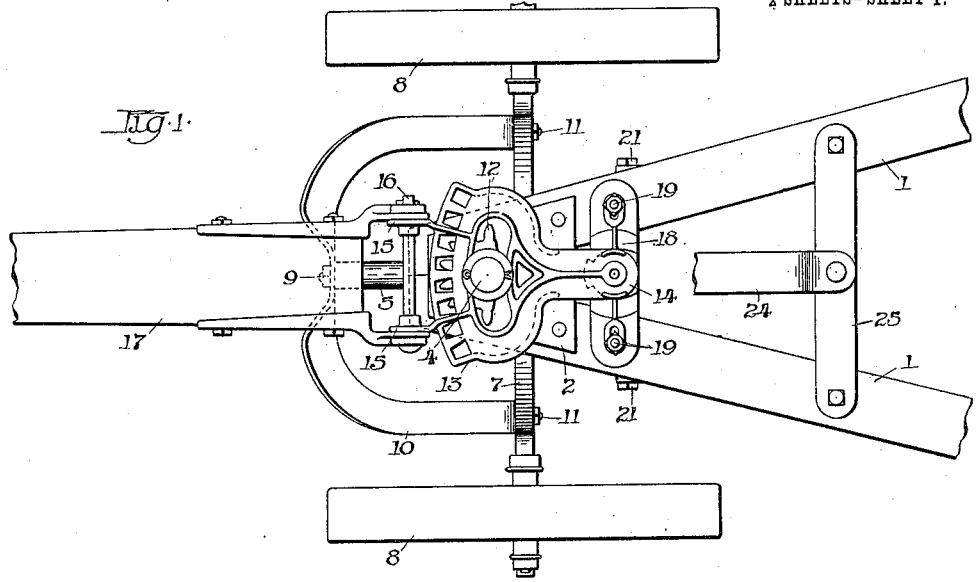
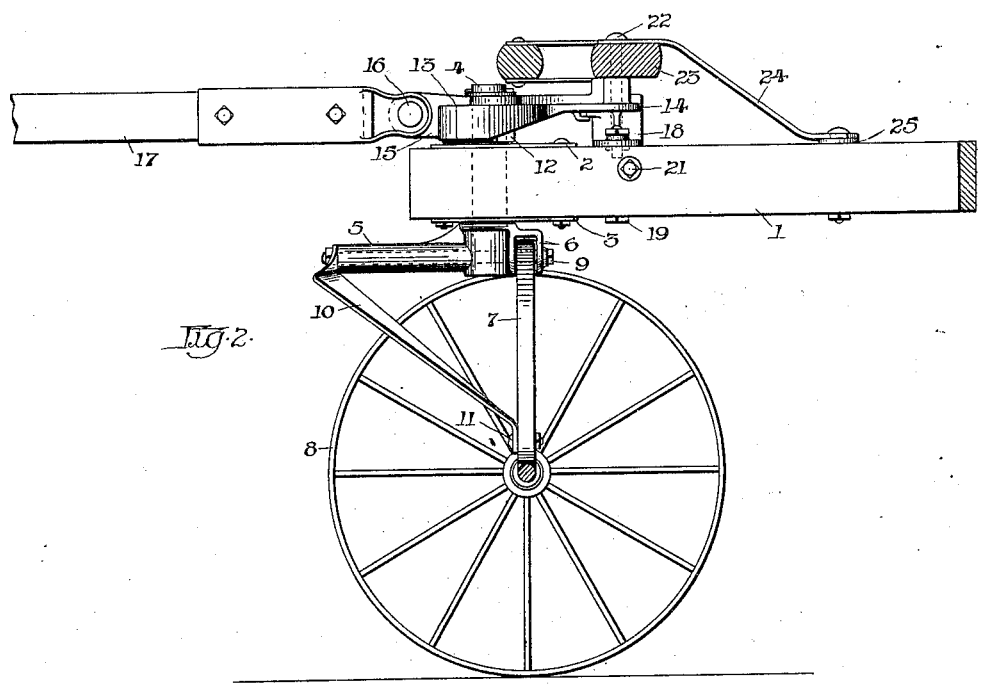
Witnesses:
F. W. Hoffmeister
W. McRobert
Inventor:
John A. Stone
By E. W. Burger
Attorney

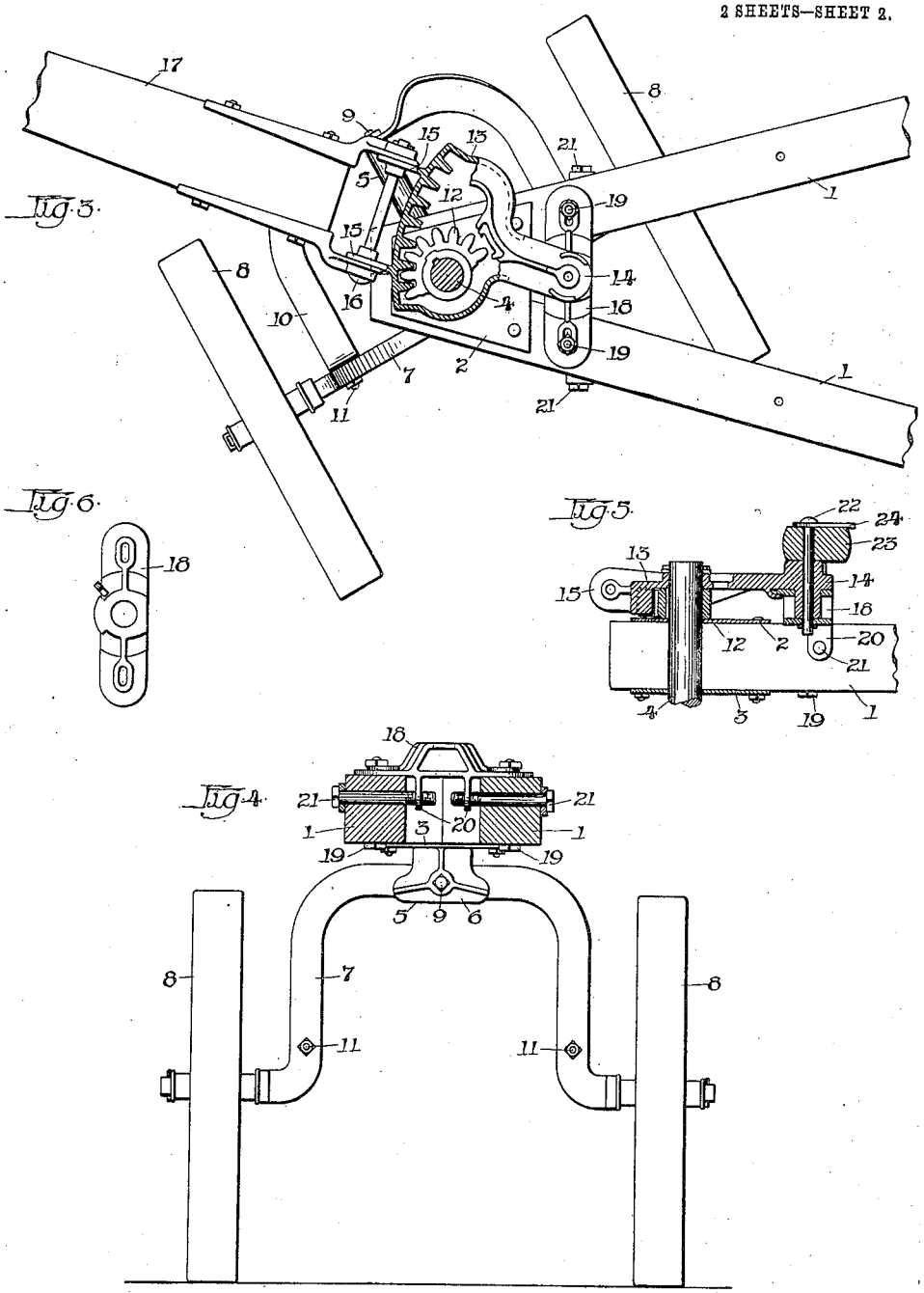

UNITED STATES PATENT OFFICE.

JOHN A. STONE, OF CHICAGO, ILLINOIS, ASSIGNOR TO INTERNATIONAL HARVESTER COMPANY, A CORPORATION OF NEW JERSEY.

TONGUE-TRUCK.

No. 914,466.  Specification of Letters Patent.  Patented March 9, 1909.

Application filed December 2, 1908. Serial No. 465,722.

*To all whom it may concern:*

Be it known that I, JOHN A. STONE, a citizen of the United States, residing at Chicago, in the county of Cook and State of Illinois, have invented certain new and useful Improvements in Tongue-Trucks, of which the following is a specification.

My invention relates to tongue trucks, and in particular to that type designed for use in connection with harvesting machines; the object of my invention being to provide a truck wherein the axle will have a differential angular movement relative to the guide tongue; means for limiting the angular movement of the truck axle, and means whereby the range of angular movement thereof may be regulated. These objects are attained by the mechanism illustrated by the accompanying drawings, in which—

Figure 1 represents a top plan view of a truck embodying my invention; Fig. 2 is a side elevation of Fig. 1; Fig. 3 is a plan view of the truck, partly in section, and designed to illustrate the differential angular movement of the truck axle relative to the guide tongue; Fig. 4 is a rear end elevation of part of Fig. 1; Fig. 5 is a detail sectional drawing representing the connection between the truck axle and guide tongue; and Fig. 6 is a detached detail of part of the guide tongue connecting mechanism.

Like reference characters designate the same parts throughout the several views.

A stub tongue including forwardly converging frame members 1, having plate members 2 and 3 secured to their upper and lower sides, respectively, is designed to be connected by any preferred means to a harvester, and plates 2 and 3 form a vertical bearing for a spindle 4, having integral therewith, at its lower end, a tubular bracket member 5 arranged at right angles with the axis of the spindle, and having at its rear end a clevis 6 adapted to receive the middle portion of an arched axle 7, upon which truck wheels 8 are journaled; the axle being connected with the clevis in a manner permitting a limited vibratile movement about a securing bolt 9 that is received by the clevis and, extending through the tubular member 5, is received by an opening in the middle portion of a brace member 10, having its opposite ends secured to opposite ends of the truck axle by means of bolts 11. A pinion 12 is secured to the upper end of the spindle, and 13 represents a gear segment engaging with the pinion, having a rearwardly projecting arm 14, and forwardly projecting ear portions 15, said ear portions having openings arranged horizontally therein adapted to receive a connecting pin 16 for the purpose of attaching a guide tongue 17 to the segment gear.

18 represents a bracket having elongated openings therein, at opposite ends thereof, that are designed to receive securing bolts 19 whereby the bracket may be adjustably secured to the frame members 1 in rear of the vertical spindle, and 20 represents depending ear portions near the middle of the bracket and adapted to receive adjusting bolts 21 whereby the bracket may be adjusted laterally relative to the line of draft of the machine. The rearwardly projecting arm 14 is pivotally connected with the bracket 18 by means of pivot pin 22, which pin also secures draft evener 23 thereto, and 24 represents a hammer strap having its forward end connected with said pin and its rear end secured to a cross-bar 25 secured to the frame members of the stub tongue. The gear segment is provided with a slotted opening concentric with the axis of the pin 22 and adapted to receive the upper end of the vertical spindle in a manner to limit the lateral swing of the gear segment. The pitch diameter of the pinion and segment gear may be such as will produce any desired differential angular movement of the truck axle relative to the guide tongue.

What I claim as my invention, and desire to secure by Letters Patent, is:

1. A tongue truck including, in combination, a stub tongue, a vertically arranged bearing secured to said stub tongue, a vertical spindle journaled in said bearing, said spindle having at its lower end a tubular bracket arranged at right angles to the axis of said spindle, a truck axle pivotally connected with one end of said bracket, brace members having one end pivotally connected with the opposite end of said bracket and their opposite ends secured to said axle.

2. A tongue truck including, in combination, a stub tongue, a vertically arranged bearing secured to said stub tongue, a vertical spindle journaled in said bearing, a tubular bracket integral with said spindle and arranged at right angles to the axis thereof, an arched truck axle having its middle portion pivotally connected with one end of said bracket, an arched brace member having its middle portion pivotally connected with the opposite end of said bracket and its ends secured to opposite ends of said axle.

3. A tongue truck including, in combination, a stub tongue, a vertically arranged bearing secured to said stub tongue, a vertical spindle journaled in said bearing, a tubular bracket integral with the lower end of said spindle, said bracket having at its rear end a clevis portion, an arched axle having its middle portion adapted to be received by said clevis portion, a bolt received by said clevis and axle and extending through said tubular bracket, brace members having their inner ends connected with the front portion of said bracket by means of said bolt, and their outer ends secured to said axle.

4. A tongue truck including, in combination, a stub tongue, a vertically arranged bearing secured to said stub tongue, a vertical spindle journaled in said bearing, a truck axle secured to the lower end of said spindle, a pinion secured to its opposite end, a guide tongue, a gear segment engaging with said pinion and connected with said stub tongue in rear of said vertical spindle by means of a vertically arranged pivotal connection, said guide tongue being connected with said gear segment forward of said vertical spindle by means of a horizontally arranged pivotal connection.

5. A tongue truck including, in combination, a stub tongue, a vertically arranged bearing secured to said stub tongue, a vertical spindle journaled in said bearing, a truck axle secured to the lower end of said spindle, a pinion secured to its opposite end, a guide tongue, a gear segment engaging with said pinion, said gear segment being connected with said stub tongue in rear of said vertical spindle by means of a vertically arranged and laterally adjustable pivotal connection, said guide tongue being connected with said gear segment forward of said vertical spindle by means of a horizontally arranged pivotal connection.

6. A tongue truck including, in combination, a stub tongue, a vertically arranged bearing secured to said stub tongue, a vertical spindle journaled in said bearing, a truck axle secured to the lower end of said spindle, a pinion secured to its opposite end, a gear segment engaging with said pinion, said gear segment being connected with said stub tongue in rear of said vertical spindle by means of a vertically arranged pivotal connection, a guide tongue, said guide tongue being connected with said gear segment forward of said vertical spindle by means of a horizontally arranged pivotal connection, said gear segment having a limited movement about its axis and transmitting a differential angular movement to said axle relative to said guide tongue.

7. A tongue truck including, in combination, a stub tongue, said stub tongue including forwardly converging frame members, plate members secured to the forward ends of said frame members upon their upper and lower sides, a vertical spindle journaled in said plate members, a truck axle secured to the lower end of said spindle, a pinion secured to its upper end, a bracket secured to said frame members in rear of said vertical spindle, said bracket having elongated openings receiving the securing means whereby it may be adjusted laterally relative to said tongue frame members, and depending ears having lateral openings therein adapted to receive adjusting bolts engaging with said frame members, a gear segment engaging said pinion and pivotally connected with said bracket, a guide tongue, said guide tongue being connected with said gear segment.

8. A tongue truck including, in combination, a stub tongue, a vertically arranged spindle journaled upon said stub tongue, a truck axle secured to the lower end of said spindle, a pinion secured to the upper end thereof, a gear segment engaging said pinion, said gear segment having a rearwardly extending arm connected with said stub tongue by means of a vertically arranged pivotal connection, said gear segment having a slotted opening therein concentric with the axis of its pivotal connection, said opening adapted to receive said vertical spindle in a manner to limit an angular movement of said gear segment, forwardly projecting ears forming part of said gear segment, and a guide tongue pivotally connected with said ears.

JOHN A. STONE.

Witnesses:
W. B. HOSSACO,
GEO. W. LINCOLN.